(12) United States Patent
Landrieve

(10) Patent No.: US 6,868,948 B2
(45) Date of Patent: Mar. 22, 2005

(54) BRAKED BEARING

(75) Inventor: Franck Landrieve, Fondettes (FR)

(73) Assignee: SKF France, Montigny le Bretonneux (FR)

( * ) Notice: Subject to any disclaimer, the term of this patent is extended or adjusted under 35 U.S.C. 154(b) by 0 days.

(21) Appl. No.: 10/296,985

(22) PCT Filed: Jun. 1, 2001

(86) PCT No.: PCT/FR01/01703

§ 371 (c)(1),
(2), (4) Date: Dec. 2, 2002

(87) PCT Pub. No.: WO01/94801

PCT Pub. Date: Dec. 13, 2001

(65) Prior Publication Data

US 2003/0173161 A1 Sep. 18, 2003

(30) Foreign Application Priority Data

Jun. 7, 2000 (FR) .......................................... 00 07297

(51) Int. Cl.⁷ .............................................. B60T 11/00
(52) U.S. Cl. ....................................... 188/350; 74/485
(58) Field of Search ...................... 188/350; 280/88; 74/485, 481, 484 R, 486

(56) References Cited

U.S. PATENT DOCUMENTS

| | | | | | |
|---|---|---|---|---|---|
| 2,320,878 A | * | 6/1943 | Manning | ..................... | 74/485 |
| 2,924,988 A | * | 2/1960 | Primeau | ..................... | 74/485 |
| 3,025,714 A | * | 3/1962 | Bliss | ..................... | 74/484 R |
| 3,762,238 A | * | 10/1973 | Piziks | ..................... | 74/485 |

FOREIGN PATENT DOCUMENTS

| | | |
|---|---|---|
| DE | 37 25 972 A1 | 2/1989 |
| DE | 195 10 717 A1 | 9/1996 |
| EP | 0 983 924 A1 | 3/2000 |
| FR | 648.646 | 12/1928 |
| GB | 183660 | 8/1922 |

* cited by examiner

Primary Examiner—Robert A. Siconolfi
Assistant Examiner—Melanie Torres
(74) Attorney, Agent, or Firm—Young & Thompson

(57) ABSTRACT

A locked antifriction bearing, for control wheel, includes an outer part and an inner part, one being rotating and the other non-rotating through at least a row of rolling elements arranged between said rotating and non-rotating parts, the device further comprising elements for detecting rotation parameters and elements for braking the rotating part. The braking elements comprise an axial stack of discs maintained in frictional contact through at least a disc angularly secured to the non-rotating part and at least a disc integral with the rotating part. The braking elements comprise at least an elastic washer for providing axially prestressed mutual contact of the friction surfaces of the discs.

10 Claims, 2 Drawing Sheets

BRAKED BEARING

BACKGROUND OF THE INVENTION

The present invention relates to the field of instrumented assemblies of the kind for control or operating wheels used, for example, to steer motor vehicles, handling vehicles or civil engineering works vehicles or any other type of vehicle or machine requiring a steering wheel.

In the conventional way, a control wheel is connected to a shaft, for example a steering column shaft, which, depending on the type of steering used, either directly turns the steering mechanism in the case of mechanical steering, actuates hydraulic pressure distributors in the case of hydraulic steering or, finally, in the case of electric steering, actuates the encoderring of a sensor delivering a signal to the electric control motor, various combinations of these types being possible.

In the case of purely electrical steering, which is increasingly commonly in use on handling vehicles such as fork lift trucks. A system detecting the rotation of the wheel, which may or may not be incorporated into the bearings, delivers, via a cable, a signal representative of the turning of the wheel to the device for steering the wheels of the vehicle. As the wheel is mounted on its support by one or more antifriction bearings and is not connected to mechanical torque-transmitting systems, the wheel can be turned with an extremely low resistive torque. Often added to this is a wheel-braking system intended to generate therein a resistive torque so as to encourage precision and driveability in the driving of the vehicle. A device of this type is described, for example, in document DE-A-195 10 717.

This device does, however, exhibit certain disadvantages among which we shall take note first of all of the relatively great axial bulk and the relatively high cost which are due to the presence of two antifriction bearings in the continuation of which is arranged a braking system employing a coil spring which presses a conical friction piece into a cup which also has a conical friction surface. The frictional torque developed by such a device is relatively low and the wear is high because of the small friction surfaces. Furthermore, the braking system alters the operating play in the bearings.

Document FR-A-2 782 970 discloses a control wheel mounted on an instrumented antifriction bearing and to which is added a braking system, the rotating part of which is supported by the rotating inner ring of the antifriction bearing and rubs against the end wall of a housing. However, in this type of device, the antifriction bearing is not mounted on a shaft and the diametral bulk of the bearing and of the device is great.

The invention proposes to overcome the disadvantages of the devices of the prior art.

SUMMARY OF THE INVENTION

The invention proposes an economical and radially unbulky device.

The braked antifriction bearing device, according to one aspect of the invention, is of the kind intended for a control wheel. The device comprises an outer part and an inner part, one being rotating and the other non-rotating, a row of rolling elements which are arranged between said rotating and non-rotating parts. Said device further comprises a means of detecting rotation parameters and a means of braking the rotating part. The braking means comprises a plurality of disks kept in frictional contact by at least one axially elastic element. This yields a radially compact device which is simple to manufacture and the braking characteristics of which are easily adjustable. The disks may form an axial stack.

As a preference, the braking means comprises at least one disk secured axially to the non-rotating part and at least one disk secured angularly to the rotating part.

As a preference, the braking means comprises at least one elastic washer which serves to ensure mutual contact with axial preload between the friction surfaces of the disks.

In one embodiment, at least one of the disks of the braking means is angularly connected to the corresponding part which supports it by means of a lug projecting into a slot.

In one embodiment, the braking means is in the form of an annular cartridge the two axial ends of which comprise a lateral element of L-shaped cross section.

In one embodiment, the braking means is arranged radially between the outer and inner parts and is arranged axially, at least in part, in the axial continuation of the rolling elements and near the latter.

In one embodiment, the bearing device comprises two rings, one secured to the rotating part and the other secured to the non-rotating part and between which the rolling elements are arranged.

In one embodiment, the means of detecting rotation parameters comprises a sensor secured to the non-rotating ring and an encoder secured to the rotating ring.

In one embodiment, the sensor comprises a connection output passing through the non-rotating part.

In one embodiment, the non-rotating part comprises a tubular portion and a radial portion which is provided with means of attaching the device to a support.

In one embodiment, the rotating part comprises a tubular portion and a radial portion which is provided with means of attaching a wheel to the device.

This braked bearing device can be fitted and mounted easily at numerous possible locations on a vehicle or on a machine, for example on a dashboard, via the housing which acts as a support. Just a few screws are needed to fix the device by means of the housing.

BRIEF DESCRIPTION OF THE DRAWINGS

The present invention will be better understood and other advantages will become apparent from reading the detailed description of a few embodiments taken by way of entirely nonlimiting examples and illustrated by the appended drawings, in which.

DETAILED DESCRIPTION OF THE PREFERRED EMBODIMENTS

Figure 1:
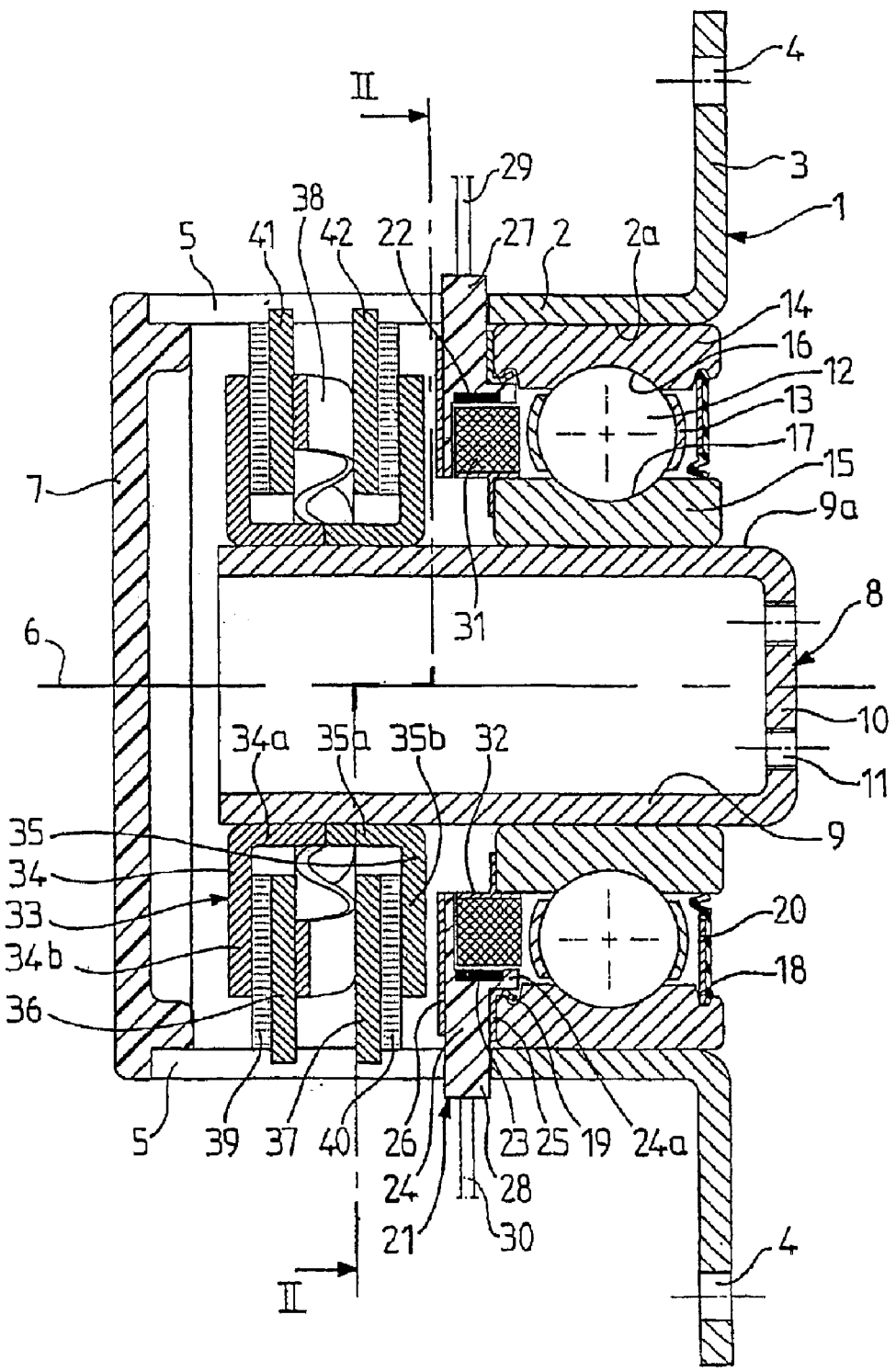
FIG. 1 is a view in axial section of a bearing device.
Figure 2:
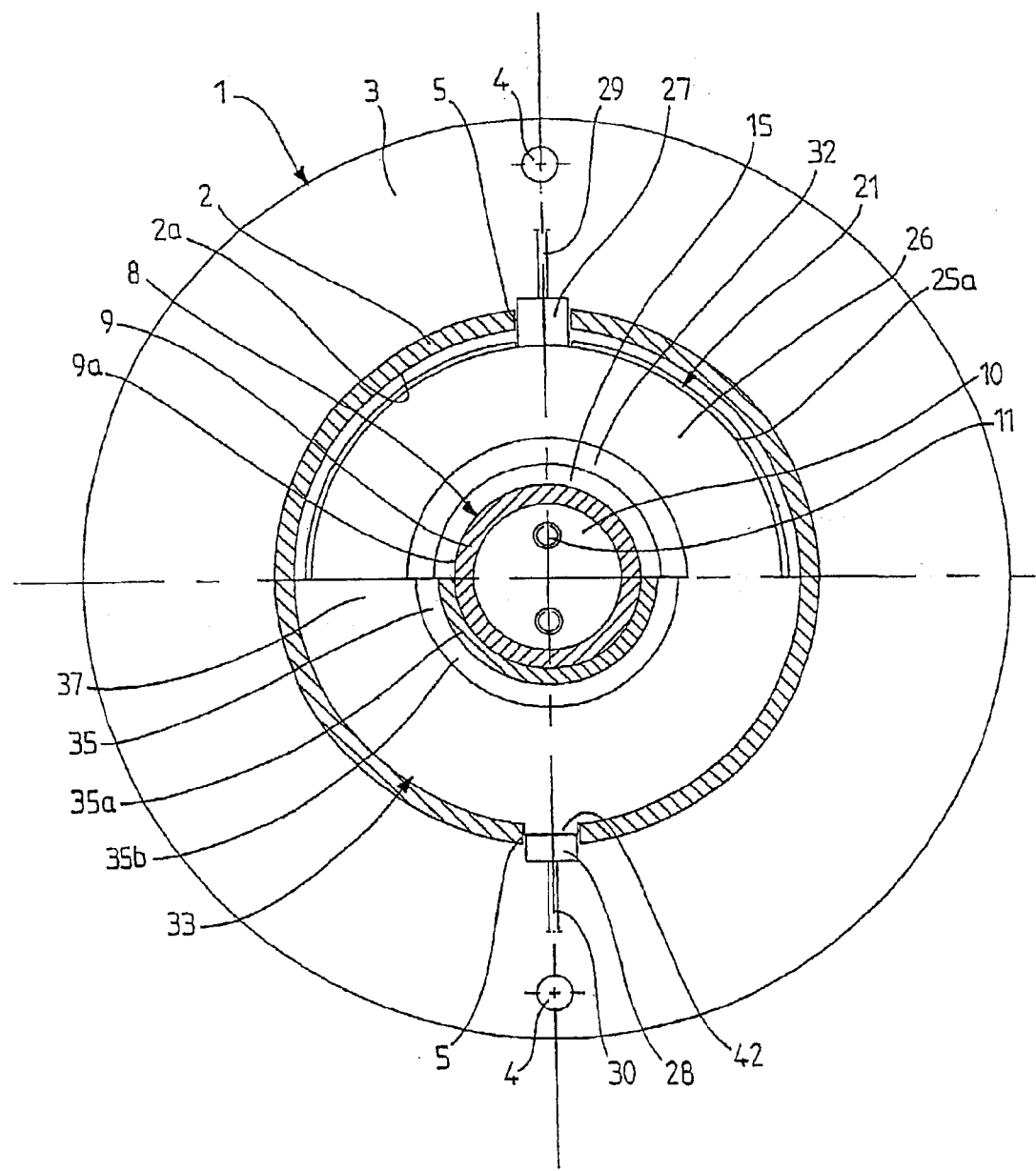
FIG. 2 is a view in section on II—II of FIG. 1 of the bearing device.

As can be seen in the figures, the antifriction bearing device comprises an outer element 1 of annular shape, with an L-shaped half section, with a tubular portion 2 and a radial portion 3 extending at one end of the tubular portion outward. The radial portion 3 is provided with a plurality of fixing holes 4 able to take screws with a view to fixing to a fixed structure, not depicted. The tubular portion 2 is provided with two notches forming slots 5 extending from the free end of said tubular portion 2 and situated opposite the radial portion 3. The slots 5 are of rectangular shape, their length being aligned with the axis referenced 6 on which the outer element 1 is centered. The outer element 1 may be made of pressed or bent sheet metal. A cap 7, for example made of synthetic material, with the shape of a disk, closes the free end of the tubular portion 2 at which the slots 5 open, being push-fitted into its bore.

The antifriction bearing device also comprises an inner element 8, also centered on the axis 6, of annular shape and U-shaped section, exhibiting a tubular portion 9 one end of which is closed off by a radial portion 10. A plurality of holes 11 are provided through the tubular portion 10 to take screws, not depicted, for example intended for fixing an operating wheel, also not depicted. The inner element 8 may also be made of pressed sheet metal. Arranged between the outer 1 and inner 8 elements is a row of rolling elements 12 which are held by a cage 13.

In the alternative form illustrated in the figures, the rolling elements 12 are arranged between outer 14 and inner 15 rings. However, provision could be made for the rolling elements to be in direct contact with the outer 1 and inner 8 elements via raceways formed on said outer and inner elements.

The outer ring 14 is push-fitted into the bore 2a of the tubular portion 2 of the outer element 1 and is provided with a raceway 16 for the rolling elements 12. The inner ring 15 is push-fitted onto the outer surface 9a of the tubular portion 9 of the inner element 8 and is provided with a raceway 17 for the rolling elements 12. The outer ring 14 is also provided with two symmetric grooves 18 and 19 formed on its bore, one on each side of the raceway 16. Fixed into the groove 18 is a sealing member 20 which rubs against a bearing surface of the inner ring 15. Fixed into the groove 19 is a sensor unit referenced 21 in its entirety.

In the example illustrated, the sensor unit 21 comprises two detection elements 22, 23, arranged diametrically opposed and each embedded in a synthetic material forming a central part 24 of the sensor unit 21. The sensor unit 21 is fixed on the front face of the outer ring 14 by means of a fixing support 25 inserted between the ring 14 and the sensor unit 21, both on the radial parts and on the circumferential parts and a free end of which is bent into the groove 19.

A cylindrical annular portion 24a is inserted partially into the bore of the non-rotating ring 14 more or less in the region of the groove 19 so that the detection elements 22, 23 can be arranged partly between the two rings 14 and 15. An external protective plate 26 is also fixed to the outside of the sensor unit 21 by crimping performed by folding the other free end 25a of the support 25 onto the periphery of the external protective plate 26.

The sensor unit 21 further comprises two wire terminals 27 and 28, which are associated respectively with the detection elements 22 and 23 and formed by an outgrowth of the synthetic material of the central part 24 for fixing the end of a cable 29, 30 by means of which a signal emitted can be passed onto an electric signal processing and operating unit, not depicted in the figures. The wire terminals 27, 28 of the sensor unit 21 each project through a slot 5 of the tubular portion 2 of the outer element 1, being in contact with the end walls of said slots 5.

The two detection elements 22, 23 each collaborate with a single encoder ring 31 mounted facing the sensor unit 21 on the external cylindrical surface of the rotating ring 15, so as to be driven in rotation by the latter.

The encoder ring 31 is mounted by means of a support 32 which is housed in part between the rings 14 and 15. The support 31, of annular shape with T-shaped cross section, is push-fitted onto the outer cylindrical surface of the rotating ring 15 and butts against a frontal surface thereof. A portion of the encoder ring 31 thus lies between the rings 14 and 15 and a portion projects outward. Most of the exterior cylindrical surface of the encoder ring 31 lies facing the two detection elements 22, 23, with a small gap.

An antifriction bearing is thus formed by the rolling elements 12 and the rings 14 and 15. One or more sealing gaskets, one or more encoders, one or more sensors, etc. may be added to this antifriction bearing.

A braking member 33 is also arranged between the exterior surface 9a of the tubular portion 9 of the inner element 8 and the bore 2a of the tubular portion 2 of the outer element 1. The braking member 33 is arranged in the axial continuation of the antifriction bearing equipped with its system for detecting the rotation parameters and is situated axially between the free end of the tubular portion 9 of the inner element 8 and the plate 26 protecting the sensor unit 21. More generally, the braking member 33 is bounded axially by the cap 7, because provision could be made for it to project axially beyond the free end of the tubular portion 9 toward said cap 7.

The braking member 33 comprises a rotating part 33a formed of two elements 34, 35 of similar form and each comprising a tubular axial portion 34a, 35a and a radial portion 34b, 35b in the form of a disk. The free ends of the tubular portions 34a, 35a are mounted in contact with one another so that the elements 34 and 35 form a rotating part 33a with a U-shaped cross section push-fitted onto the exterior surface 9a of the tubular portion 9.

The non-rotating part 33b of the braking member 33 comprises two metal disks 36 and 37 arranged axially between the radial portions 34b and 35b of the rotating part 33a. Arranged between the disks 36 and 37 is an axially elastic washer 38. A friction lining or disk 39 is inserted axially between the disk 36 and the disk-shaped radial portion 34b. This friction lining or disk is made of a material with a high coefficient of friction with respect to the fixed disks 36 and the radial portion 34b. In the case of a lining, it is preferably bonded to the disk 36 and rubs against the radial portion 34b. The same is true for the friction lining 40, the disk 37 and the radial portion 35b.

The disks 36 and 37 each comprise two lugs 41, 42 projecting radially outward, diametrally opposed and arranged each one in a slot 5 of the tubular portion 2 of the outer element 1.

In operation, the disks 36 and 37 are angularly secured to the outer element 1 because of the presence of the lugs 41, 42 which thus prevents any angular displacement with respect to the slots 5. The disks 36, 37 are therefore fixed while the lateral elements 34, 35 can turn. The frictional contact between the fixed disks and the rotating elements by way of the friction linings or disks 39, 40 therefore creates a resistive torque.

The elastic washer 38 permanently maintains an axial force tending to force the disks 36 and 37 apart and thus ensure that the friction linings or disks 39 and 40 rub on the corresponding surfaces of the radial portions 34b and 35b of the rotating part 33a of the braking member 33.

The braking means is thus in the form of a compact cartridge arranged radially between the fixed outer element 1 and the rotating inner element 8, in the axial continuation of and in close proximity to the instrumented antifriction bearing.

The structure of such a braking means has numerous advantages. First of all, it is very compact. Further, its modular design makes the frictional torque easy to alter simply by altering the number of disks, the number or type of elastic preloading washers, it being possible for this to be performed without any significant variation in the axial bulk of the cartridge, given the thinness of the components.

The braking means can, in a small bulk, generate a high frictional torque because of the number and magnitude of the surfaces in frictional contact.

The structure of the braking cartridge allows the preload to be preset easily by construction or by assembly, and therefore allows the braking torque to be calibrated.

All that is required is to determine the value of the gap needed between the two radial portions 34b and 35b, according to the desired preload.

This gap value is obtained easily when the two elements 34 and 35 are mounted on the inner element 8. All that is required is for the extent to which these two elements are push-fitted together to be adjusted, or alternatively for the length of the tubular parts 34a and 35a to be predefined so that the desired gap is obtained when the free ends of the two tubular portions come into contact with one another.

This braking torque will remain particularly stable over time during operation because of the very little wear due to the large friction surfaces. The fact that the axial forces exerted on the wheel fixed to the inner element 8 do not in any way alter the braking torque is another advantage of the invention.

Finally, such a braking cartridge device has absolutely no influence on the antifriction bearings and is not likely to alter the clearance or preload thereof.

The various functions, particularly the bearing function afforded by the rolling elements 12, the function of detecting rotation parameters afforded by the sensor unit 21 and the function of braking afforded by the braking member 33 are performed by means arranged in an annular space bounded radially between the tubular portion 2 of the outer element 1 and the tubular portion 9 of the inner element 8 and bounded axially between the radial portion 34a of the element 34 of the braking member 33 and the frontal surface of the rings 14 and 15 opposite the sensor unit 21.

The various elements can be mounted by push-fitting the antifriction bearing and the braking member 33 onto the inner element 8 then by bringing the outer element 1 from right to left in FIG. 1, causing the outer ring 14 to be push-fitted into the bore 2a, causing the wire terminals 27 and 28 to be pass into the slots 5 and causing the lugs 41 and 42 also to pass into the same slots 5. The cap 7 is then fixed onto the outer element 1.

It will be noted that the slots 5, of which in an alternative form there may be a number different than 2, allow both the passage of the cables 28 and 29 and the angular securing of the non-rotating part 33b of the braking member 33 and of the outer element 1. The various elements are all of simple shape. The antifriction bearing may be of standard and therefore very economical type. The braking member can be manufactured from sheet metal parts which are also very economical.

In place of the wire terminals 27 and 28, it would be possible to imagine a connector originating directly from the sensor unit 21. The elastic washer 38 constantly maintains an axial force which tends to move the disks 36 and 37 apart, increasing the friction of the friction linings or disks 39 and 40 on the corresponding surfaces of the rotating part 33a of the braking member 33.

Of course, it is possible to imagine reversing the arrangement of the braking member, with the friction linings and disks secured to the elements 34 and 35, or alternatively reversing by swapping the rotating part and the non-rotating part. It would even be possible to imagine a rotating outer element 1 and an non-rotating inner element 8. If the diameter of the inner element is small, it can be made from a solid piece, of the cylindrical rod type, of a metallic or synthetic material. In the latter instance, said inner element could be produced as one piece with other parts.

This braked antifriction bearing is particularly simple and economical to produce. It is perfectly modular and it is possible, in the same bulk, simply by changing the elastic washer 38, to obtain a higher or lower braking torque. It is also possible to alter the material of the disks or of the friction linings to alter the resulting frictional torque.

It is also possible very easily to adapt the number of disks or preload washers to alter the braking torque without that considerably altering the axial bulk of the device. The resistive torque generated by the braking device can be high for a small bulk. This torque is perfectly calibrated by design and is particularly stable over time because the small amount of wear of the member of the elements has very little influence on the resistive torque. The entire braked antifriction bearing is in the form of a cartridge which is very unlikely to lose parts and which appropriately protects the most delicate elements.

In the examples illustrated, the sensor unit 21 is located between the rolling elements 12 and the braking member 33. It is of course conceivable, without departing from the scope of the invention, to design a device in which the sensor unit is arranged on one side of the row of rolling elements 12 and the braking member is arranged axially on the other side of said row. In this case, the braking member 33 is no longer axially adjacent to the sensor unit as in FIG. 1, but is axially adjacent to the rolling elements 12.

Of course it would be possible to provide a cartridge in which the device for detecting rotation parameters was not mounted on the bearing rings but beside them, for example in direct contact with the outer 1 and inner 8 elements. Provision could be made for just one single detection element and one single wire terminal to be used.

What is claimed is:

1. A braked bearing device of the kind for a control wheel, comprising an outer part and an inner part, one being rotating and the other non-rotating, a row of rolling elements which are arranged between said rotating and non-rotating parts, said device further comprising a means of detecting rotation parameters and a means of braking the rotating part,
   wherein the braking means is in the form of an annular cartridge the two axial ends of which comprise a lateral element having an L-shaped cross section exhibiting a radial portion and an axial portion, the braking means further comprises a plurality of disks kept in frictional contact by at least one axially elastic element and is arranged radially between the outer and inner parts.

2. The device as claimed in claim 1, wherein the braking means comprises at least one disk secured axially to the non-rotating part and at least one disk secured angularly to the rotating part.

3. The device as claimed in claim 1, wherein the braking means comprises at least one elastic washer which serves to ensure mutual contact with axial preload between the friction surfaces of the disks.

4. The device as claimed in claim 1, wherein at least one of the disks of the braking means is angularly connected to the corresponding part which supports it by means of a lug projecting into a slot.

5. The device as claimed in claim 1, wherein the braking means is arranged axially, at least in part, in the axial continuation of the rolling elements and near the latter.

6. The device as claimed in claim 1, wherein the device further comprises two rings, one secured to the rotating part and the other secured to the non-rotating part and between which the rolling elements are arranged.

7. The device as claimed in claim 6, wherein the means of detecting rotation parameters comprises a sensor secured to the non-rotating ring and an encoder secured to the rotating ring.

8. The device as claimed in claim 7, wherein the sensor comprises a connection output passing through the non-rotating part.

9. The device as claimed in claim 1, wherein the non-rotating part comprises a tubular portion and a radial portion which is provided with means of attaching the device to a support.

10. The device as claimed in claim 1, wherein the rotating part comprises a tubular portion and a radial portion provided with means of attaching a wheel to the device.

* * * * *